United States Patent
Sharabani et al.

(10) Patent No.: US 8,752,026 B2
(45) Date of Patent: Jun. 10, 2014

(54) EFFICIENT CODE INSTRUMENTATION

(75) Inventors: Adi Sharabani, Ramat Gan (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 12/475,739

(22) Filed: Jun. 1, 2009

(65) Prior Publication Data

US 2010/0306745 A1    Dec. 2, 2010

(51) Int. Cl.
G06F 9/44    (2006.01)
G06F 9/45    (2006.01)

(52) U.S. Cl.
USPC ............ 717/130; 717/128; 717/140; 717/158

(58) Field of Classification Search
None
See application file for complete search history.

(56) References Cited

U.S. PATENT DOCUMENTS

| | | | | |
|---|---|---|---|---|
| 5,790,858 A * | 8/1998 | Vogel | ............................ | 717/130 |
| 5,909,577 A | 6/1999 | Devanbu | | |
| 6,742,178 B1 * | 5/2004 | Berry et al. | ................... | 717/130 |
| 7,174,536 B1 * | 2/2007 | Kothari et al. | ................ | 717/109 |
| 7,877,743 B2 * | 1/2011 | Makiyori et al. | ............ | 717/158 |
| 7,926,042 B2 * | 4/2011 | Mehta et al. | ................... | 717/130 |
| 8,176,480 B1 * | 5/2012 | Spertus | ......................... | 717/158 |
| 2003/0204840 A1 * | 10/2003 | Wu | ................................ | 717/158 |
| 2004/0031020 A1 * | 2/2004 | Berry et al. | ................... | 717/130 |
| 2005/0071819 A1 * | 3/2005 | Calyanakoti et al. | ......... | 717/128 |
| 2006/0190930 A1 * | 8/2006 | Hecht et al. | ................... | 717/128 |
| 2006/0200806 A1 * | 9/2006 | Tasinga | ......................... | 717/128 |
| 2007/0074187 A1 * | 3/2007 | O'Brien | ........................ | 717/140 |
| 2007/0168998 A1 * | 7/2007 | Mehta et al. | ................... | 717/130 |
| 2007/0180439 A1 * | 8/2007 | Sundararajan et al. | ........ | 717/158 |
| 2007/0240141 A1 * | 10/2007 | Qin et al. | ....................... | 717/158 |
| 2008/0046872 A1 * | 2/2008 | Cooper | .......................... | 717/140 |
| 2008/0052696 A1 * | 2/2008 | Pradadarao | ................... | 717/158 |
| 2008/0244536 A1 | 10/2008 | Farchi et al. | | |
| 2008/0276227 A1 * | 11/2008 | Greifeneder | ................... | 717/130 |
| 2009/0049429 A1 * | 2/2009 | Greifeneder et al. | ......... | 717/128 |
| 2009/0089771 A1 * | 4/2009 | Gill et al. | ....................... | 717/158 |
| 2009/0217251 A1 * | 8/2009 | Connolly | ....................... | 717/140 |
| 2009/0249305 A1 * | 10/2009 | Li et al. | .......................... | 717/130 |
| 2009/0249306 A1 * | 10/2009 | Li et al. | .......................... | 717/130 |
| 2010/0100873 A1 * | 4/2010 | Shagin | ........................... | 717/130 |

FOREIGN PATENT DOCUMENTS

| | | |
|---|---|---|
| JP | 09-050389 | 2/1997 |
| JP | 2007-094453 | 4/2007 |

OTHER PUBLICATIONS

Guoqing Xu, Efficient Checkpointing of Java Software Using Context-Sensitive Capture and Replay, 2007, pp. 1-9.*
Steven Wallace, SuperPin: Parallelizing Dynamic Instrumentation for Real-Time Performance, 2007, pp. 1-8.*
Markus Mock, Improving Program Slicing with Dynamic Points-To-Data, 2002, pp. 2-8.*
OProfile About Page, Nov. 24, 2009 <http://oprofile.sourceforge.net/about/>.
Duesterwald et al. "Distributed Slicing and Partial Re-Execution for Distributed Programs", 1992. URL: http://www.springerlink.com/content/p6877q01100h6388/.

* cited by examiner

*Primary Examiner* — Thuy Dao
*Assistant Examiner* — Mongbao Nguyen
(74) *Attorney, Agent, or Firm* — North Shore Patents, P.C.; Michele Liu Baillie; Lesley Leonessa

(57) ABSTRACT

A method for instrumenting a computer program, the method including identifying a program slice within a computer program, and instrumenting the program slice within the program.

13 Claims, 3 Drawing Sheets

EFFICIENT CODE INSTRUMENTATION

FIELD OF THE INVENTION

The present invention relates to monitoring computer-based application software in general, and more particularly to instrumenting computer-based application software.

BACKGROUND OF THE INVENTION

Code instrumentation is a technique that allows computer software to be monitored at runtime, such as to facilitate debugging efforts. For example, software code may be instrumented by inserting instructions that display debugging messages or that write information related to program behavior to a log file. In this way software developers may learn about the internal behavior of the software they write and identify aberrant behavior.

The main drawback of code instrumentation is that it typically requires a significant amount of resources, both in terms of memory and of processing power. Typically, instrumentation engines insert instructions into the entire code base of a software application, resulting in bloated and sluggish code. Furthermore, instrumentation engines typically employ only rudimentary logic to determine the parts of a software application where instrumentation is both applicable and desirable. For example, instrumentation engines often insert instructions into parts of software code that are unreachable given an input vector that is of interest during debugging, or even parts that are unreachable under any conditions (i.e., dead code). More efficient code instrumentation would therefore be advantageous.

SUMMARY OF THE INVENTION

The present invention in embodiments thereof discloses novel systems and methods for efficient instrumentation of computer-based software applications.

In one aspect of the present invention a method is provided for instrumenting a computer program, the method including identifying a program slice within a computer program, and instrumenting the program slice within the program.

In another aspect of the present invention the identifying step includes identifying the program slice where the program slice includes fewer than all of the statements in the computer program.

In another aspect of the present invention the identifying step includes identifying the program slice where the program slice includes any statements in the computer program that meet at least one predefined slicing criterion.

In another aspect of the present invention the identifying step includes applying the at least one predefined slicing criterion to include within the program slice any statements in the computer program that directly or indirectly relate to an action performed with a selected variable before or after a specific point within the computer program.

In another aspect of the present invention the identifying step includes applying the at least one predefined slicing criterion to include within the program slice any statements in the computer program that directly or indirectly relate to a predefined input vector and entry point of the computer program.

In another aspect of the present invention the instrumenting step includes applying at least one predefined instrumentation criterion to the program slice.

In another aspect of the present invention the instrumenting step includes instrumenting the program slice within the computer program in a manner that does not change the underlying functionality of the program that is not related to the instrumentation.

In another aspect of the present invention the method further includes executing the instrumented program.

In another aspect of the present invention a system is provided for instrumenting a computer program, the system including a program slicer configured to identify a program slice within a computer program, and an instrumentation engine configured to instrument the program slice within the program.

In another aspect of the present invention the program slicer is configured to include within the program slice fewer than all of the statements in the computer program.

In another aspect of the present invention the program slicer is configured to include within the program slice any statements in the computer program that meet at least one predefined slicing criterion.

In another aspect of the present invention the program slicer is configured to apply the at least one predefined slicing criterion to include within the program slice any statements in the computer program that directly or indirectly relate to an action performed with a selected variable before or after a specific point within the computer program.

In another aspect of the present invention the program slicer is configured to apply the at least one predefined slicing criterion to include within the program slice any statements in the computer program that directly or indirectly relate to a predefined input vector and entry point of the computer program.

In another aspect of the present invention the instrumentation engine is configured to apply at least one predefined instrumentation criterion to the program slice.

In another aspect of the present invention the instrumentation engine is configured to instrument the program slice within the computer program in a manner that does not change the underlying functionality of the program that is not related to the instrumentation.

In another aspect of the present invention a computer program product is provided for instrumenting a computer program, the computer program product including a computer readable medium, and computer program instructions operative to identify a program slice within a computer program, and instrument the program slice within the program, where the program instructions are stored on the computer readable medium.

In another aspect of the present invention the computer program instructions include instructions operative to identify the program slice where the program slice includes any statements in the computer program that meet at least one predefined slicing criterion.

In another aspect of the present invention the computer program instructions include instructions operative to apply the at least one predefined slicing criterion to include within the program slice any statements in the computer program that directly or indirectly relate to an action performed with a selected variable before or after a specific point within the computer program.

In another aspect of the present invention the computer program instructions include instructions operative to apply the at least one predefined slicing criterion to include within the program slice any statements in the computer program that directly or indirectly relate to a predefined input vector and entry point of the computer program.

In another aspect of the present invention the computer program instructions include instructions operative to instrument the program slice within the computer program in a manner that does not change the underlying functionality of the program that is not related to the instrumentation.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
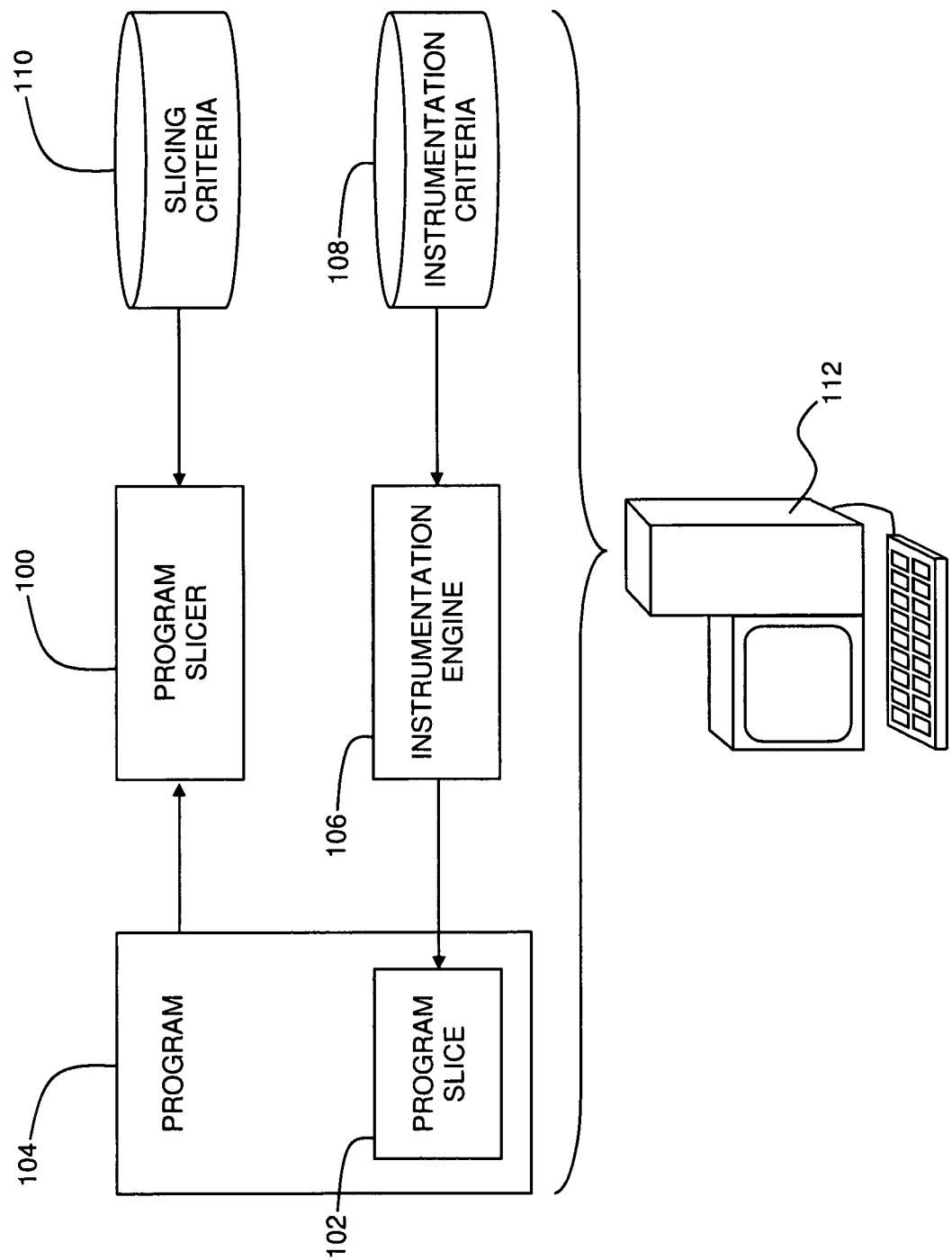
FIG. 1 is a simplified conceptual illustration of a system for efficient instrumentation of computer-based software applications, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified illustration of a system for efficient instrumentation of computer-based software applications, constructed and operative in accordance with an embodiment of the present invention. In the system of FIG. 1, a program slicer 100 identifies a program slice 102 within a computer program 104 in accordance with conventional program slicing techniques, such as where static analysis techniques are used to identify statements within program 104 that meet one or more predefined slicing criteria 110. Slicing criteria 110 may, for example, include within program slice 102 any statements in computer program 102 that directly or indirectly relate to an action performed with a selected variable before and/or after a specific point within program 104, and/or that relate to a predefined input vector and entry point of program 104. Preferably, program slice 102 includes fewer than all of the statements in computer program 104. An instrumentation engine 106 applies one or more predefined instrumentation criteria 108 to program slice 102 to determine what instrumentation is to be inserted, as well as where to insert the instrumentation into program slice 102 within program 104, and instruments program slice 102 within program 104 accordingly. The instrumentation applied by instrumentation engine 106 preferably does not change the underlying functionality of program 104, such that the behavior of program 104 both before and after instrumentation is identical when the behavior of the instrumentation is disregarded.

In one embodiment any of the elements shown in FIG. 1 are implemented as a computer program product embodied in a computer-readable medium, such as in the form of computer program instructions stored on magnetic or optical storage media or embedded within computer hardware, and are executed by or otherwise accessible to a computer 112.

Figure 2:
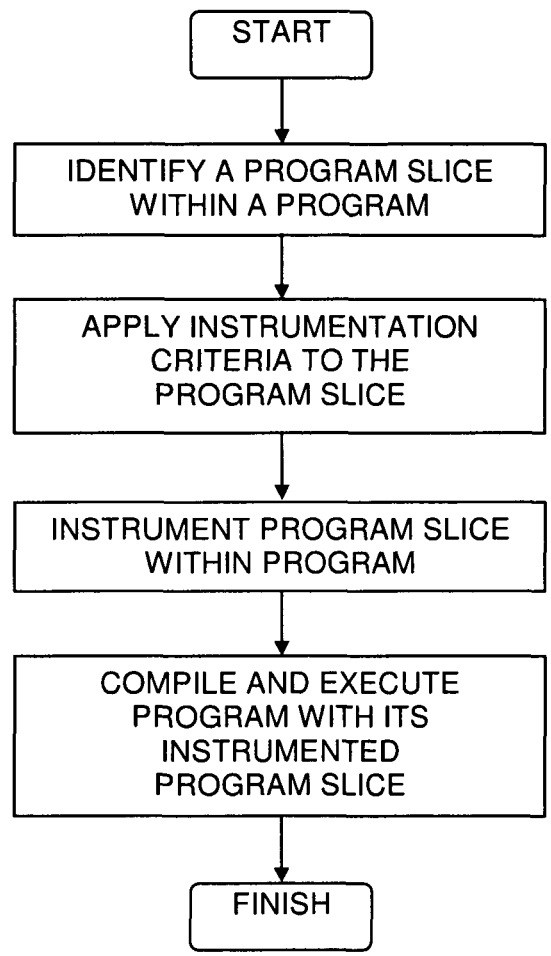
FIG. 2 is a simplified flowchart illustration of an exemplary method of operation of the system of FIG. 1, operative in accordance with an embodiment of the present invention.

Reference is now made to FIG. 2, which is a simplified flowchart illustration of an exemplary method of operation of the system of FIG. 1, operative in accordance with an embodiment of the present invention. In the method of FIG. 2, a program slice is identified within a computer program in accordance with conventional program slicing techniques. One or more predefined instrumentation criteria are applied to the program slice to determine what instrumentation is to be inserted, as well as where to insert the instrumentation into the program slice within the program, and the program slice is instrumented accordingly within the program. The program, together with the identified program slice and its instrumentation, may be compiled if required and executed.

It will be appreciated that instrumenting only a program slice within a program requires significantly less memory and processing power than would instrumenting the entire program. Furthermore, instrumenting an identified program slice greatly reduces the chance that unreachable code will be instrumented.

Figure 3:
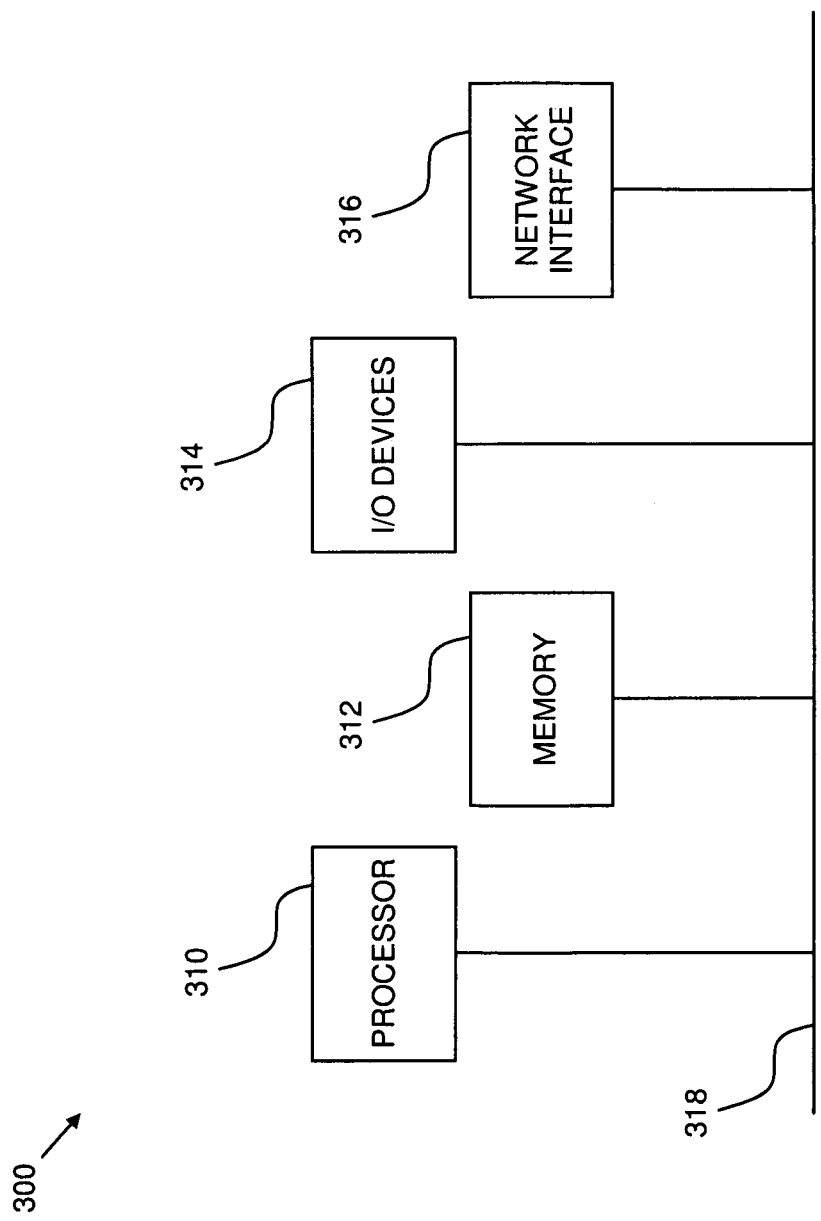
FIG. 3 is a simplified block diagram illustration of an exemplary hardware implementation of a computing system, constructed and operative in accordance with an embodiment of the present invention.

Referring now to FIG. 3, block diagram 300 illustrates an exemplary hardware implementation of a computing system in accordance with which one or more components/methodologies of the invention (e.g., components/methodologies described in the context of FIGS. 1 and 2) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for instrumenting a computer program, the method comprising:

identifying a program slice within a computer program wherein said program slice includes any statements in said computer program that meet at least one predefined slicing criterion, and wherein identifying the program slice comprises applying said at least one predefined slicing criterion to include within said program slice any statements in said computer program that directly or indirectly relate to a predefined input vector and entry point of said computer program;

instrumenting, by an instrumentation engine, said program slice within said computer program prior to executing said instrumented computer program, wherein said instrumenting does not instrument unreachable code; and executing said instrumented computer program.

2. A method according to claim 1 wherein said identifying step comprises identifying said program slice wherein said program slice includes fewer than all of the statements in said computer program.

3. A method according to claim 1 wherein said identifying step comprises applying said at least one predefined slicing criterion to include within said program slice any statements in said computer program that directly or indirectly relate to an action performed with a selected variable before or after a specific point within said computer program.

4. A method according to claim 1 wherein said instrumenting step comprises applying at least one predefined instrumentation criterion to said program slice, wherein said program slice comprises unexecuted program code, and wherein said at least one predefined instrumentation criterion determines what instrumentation is to be inserted into said program slice, and wherein said at least one predefined instrumentation criterion determines where said instrumentation is to be inserted into said program slice.

5. A method according to claim 4 wherein said instrumenting step comprises instrumenting said program slice, wherein said program slice comprises unexecuted program code, within said computer program in a manner that does not change the underlying functionality of said program that is not related to said instrumentation.

6. A system for instrumenting a computer program, the system comprising:
   a processor; and
   a computer readable memory device, having computer readable program code embodied therewith, said computer readable program code configured to:
   identify, by a program slicer, a program slice within a computer program, wherein said program slice includes any statements in said computer program that meet at least one predefined slicing criterion, and wherein identifying the program slice comprises applying said at least one predefined slicing criterion to include within said program slice any statements in said computer program that directly or indirectly relate to a predefined input vector and entry point of said computer program;
   instrument, by an instrumentation engine, said program slice within said computer program prior to executing said instrumented computer program, wherein said instrumenting does not instrument unreachable code; and
   execute said instrumented computer program.

7. The system of claim 6 wherein said program slicer is configured to include within said program slice fewer than all of the statements in said computer program.

8. The system of claim 6 wherein said program slicer is configured to apply said at least one predefined slicing criterion to include within said program slice any statements in said computer program that directly or indirectly relate to an action performed with a selected variable before or after a specific point within said computer program.

9. The system of claim 6 wherein said instrumentation engine is configured to apply at least one predefined instrumentation criterion to said program slice, wherein said program slice comprises unexecuted program code, and wherein said at least one predefined instrumentation criterion determines what instrumentation is to be inserted into said program slice, and wherein said at least one predefined instrumentation criterion determines where said instrumentation is to be inserted into said program slice.

10. The system of claim 9 wherein said instrumentation engine is configured to instrument said program slice, wherein said program slice comprises unexecuted program code, within said computer program in a manner that does not change the underlying functionality of said program that is not related to said instrumentation.

11. A computer program product for instrumenting a computer program, the computer program product comprising:
    a computer readable memory device having computer readable program code embodied therewith, said computer readable program code configured to:
    identify a program slice within a computer program, wherein said program slice includes any statements in said computer program that meet at least one predefined slicing criterion, and wherein identifying the program slice comprises applying said at least one predefined slicing criterion to include within said program slice any statements in said computer program that directly or indirectly relate to a predefined input vector and entry point of said computer program;
    instrument, by an instrumentation engine, said program slice within said computer program prior to executing said instrumented computer program, wherein said instrumenting does not instrument unreachable code; and
    execute said instrumented computer program.

12. The computer program product of claim 11, wherein said computer readable program code is further configured to:
    apply said at least one predefined slicing criterion to include within said program slice any statements in said computer program that directly or indirectly relate to an action performed with a selected variable before or after a specific point within said computer program.

13. The computer program product of claim 11, wherein said computer readable program code is further configured to:
    apply at least one predefined instrumentation criterion to said program slice, wherein said program slice comprises unexecuted program code, and wherein said at least one predefined instrumentation criterion determines what instrumentation is to be inserted into said program slice, and wherein said at least one predefined instrumentation criterion determines where said instrumentation is to be inserted into said program slice; and
    instrument said program slice within said computer program in a manner that does not change the underlying functionality of said program that is not related to said instrumentation.

* * * * *